United States Patent
Freeman-Baer et al.

(10) Patent No.: US 9,949,085 B2
(45) Date of Patent: Apr. 17, 2018

(54) SYSTEM FOR COLLECTION, ANALYTICS, AND DISPLAY OF INDOOR POSITIONING DATA

(71) Applicant: General Electric Company, Schenectady, NY (US)

(72) Inventors: Diana Freeman-Baer, San Ramon, CA (US); Lokesh Babu Krishnamoorthy, San Ramon, CA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 15/398,239

(22) Filed: Jan. 4, 2017

(65) Prior Publication Data

US 2017/0201861 A1    Jul. 13, 2017

Related U.S. Application Data

(60) Provisional application No. 62/277,590, filed on Jan. 12, 2016.

(51) Int. Cl.
| | |
|---|---|
| *H04W 24/00* | (2009.01) |
| *H04W 4/02* | (2018.01) |
| *H04W 4/04* | (2009.01) |
| *H04W 4/00* | (2018.01) |
| *H04L 29/08* | (2006.01) |

(52) U.S. Cl.
CPC ............. *H04W 4/023* (2013.01); *H04L 67/12* (2013.01); *H04W 4/008* (2013.01); *H04W 4/043* (2013.01)

(58) Field of Classification Search
CPC ....... H04W 8/245; H04W 4/02; H04W 64/00; H04W 4/023; H04W 4/043; H04W 4/008; H04M 1/72519; G01S 1/02; H04L 67/12
USPC ............ 455/457, 456.1, 418, 550.1; 342/452
See application file for complete search history.

(56) References Cited

U.S. PATENT DOCUMENTS

| | | | |
|---|---|---|---|
| 2012/0021762 A1* | 1/2012 | Garin ................... | G01C 21/206 455/456.1 |
| 2014/0045549 A1* | 2/2014 | Ryan .................... | H04N 5/3532 455/556.1 |
| 2014/0274116 A1* | 9/2014 | Xu ......................... | G01S 11/06 455/456.1 |

(Continued)

*Primary Examiner* — Danh Le
(74) *Attorney, Agent, or Firm* — Peter T. DiMauro; GE Global Patent Operation (57) ABSTRACT

An indoor positioning data system includes a mobile device having an indoor positioning system (IPS) mobile app, an enterprise server having a control processor, a datastore including a data metric analytic algorithm, and position beacons distributed throughout a volume of an indoor space to be monitored configured to broadcast their respective positions. The control processor configured to perform the data metric analytic algorithm, to collect position information from the mobile device and position information from the position beacons, to compare the collected position information to a predetermined distance threshold, if the collected position information is within the predetermined distance threshold, record the position of the mobile device in the data records, and display results of the data metric algorithm on a display of a client computing device. A non-transitory computer-readable medium containing executable instructions is also disclosed.

16 Claims, 8 Drawing Sheets

(56) References Cited

U.S. PATENT DOCUMENTS

| | | | |
|---|---|---|---|
| 2014/0280316 A1* | 9/2014 | Ganick | G06F 17/30522 |
| | | | 707/769 |
| 2014/0355461 A1* | 12/2014 | Aldana | G01S 5/00 |
| | | | 370/252 |
| 2015/0061938 A1* | 3/2015 | Moraleda | G01S 5/0294 |
| | | | 342/452 |
| 2015/0105048 A1* | 4/2015 | El Mghazli | H04W 8/205 |
| | | | 455/411 |
| 2016/0047890 A1* | 2/2016 | Ryan | G01S 5/16 |
| | | | 398/118 |
| 2016/0227367 A1* | 8/2016 | Alsehly | H04W 4/025 |
| 2017/0019264 A1* | 1/2017 | Nugent | H04L 12/282 |

\* cited by examiner

SYSTEM FOR COLLECTION, ANALYTICS, AND DISPLAY OF INDOOR POSITIONING DATA

CLAIM OF PRIORITY

This patent application claims the benefit of priority, under 35 U.S.C. § 119, of U.S. Provisional Patent Application Ser. No. 62/277,590, filed Jan. 12, 2016 titled "System for Collection, Analytics, and Display of Indoor Positioning Data," the entire disclosure of which is incorporated herein by reference.

BACKGROUND

An indoor positioning system (IPS) is a system to locate objects or people inside of a structure (e.g., a building, garage, mine, etc.) using a variety of technologies that can locate mobile devices (e.g., RF identification tags, mobile phones, mobile devices, etc.) appended and/or associated with objects, or in the possession of a person moving about the structure. An IPS can provide organizations with the detailed behavior and interaction of people, assets and inventory within the structure, while achieving a high location accuracy. For example, an IPS can be used at a construction site to track the locations of personnel, materials, and machinery.

DETAILED DESCRIPTION

Embodying systems and methods provide an indoor positioning system (IPS) that can collect, analyze, and display indoor positioning data pertaining to the location of persons in a space or building or other structure. Embodying elements can include a dashboard or display, which may be a unitary platform that can enable monitoring and managing of multiple systems. For example, such systems may comprise the control and positional locating of one or more of lighting, enterprise personnel, visitors, and guests.

The platform can be implemented as a mobile communication device application, or ("app") on a computing device (e.g., personal computer, server based enterprise system, tablet, mobile computing devices, etc.). Embodying systems and methods provide for both the monitoring and/or control of lighting systems, and the monitoring of a person's movement within a space or building (e.g., including a retail commercial environment), or other structure such as a parking garage, mine, etc.

Figure 1:
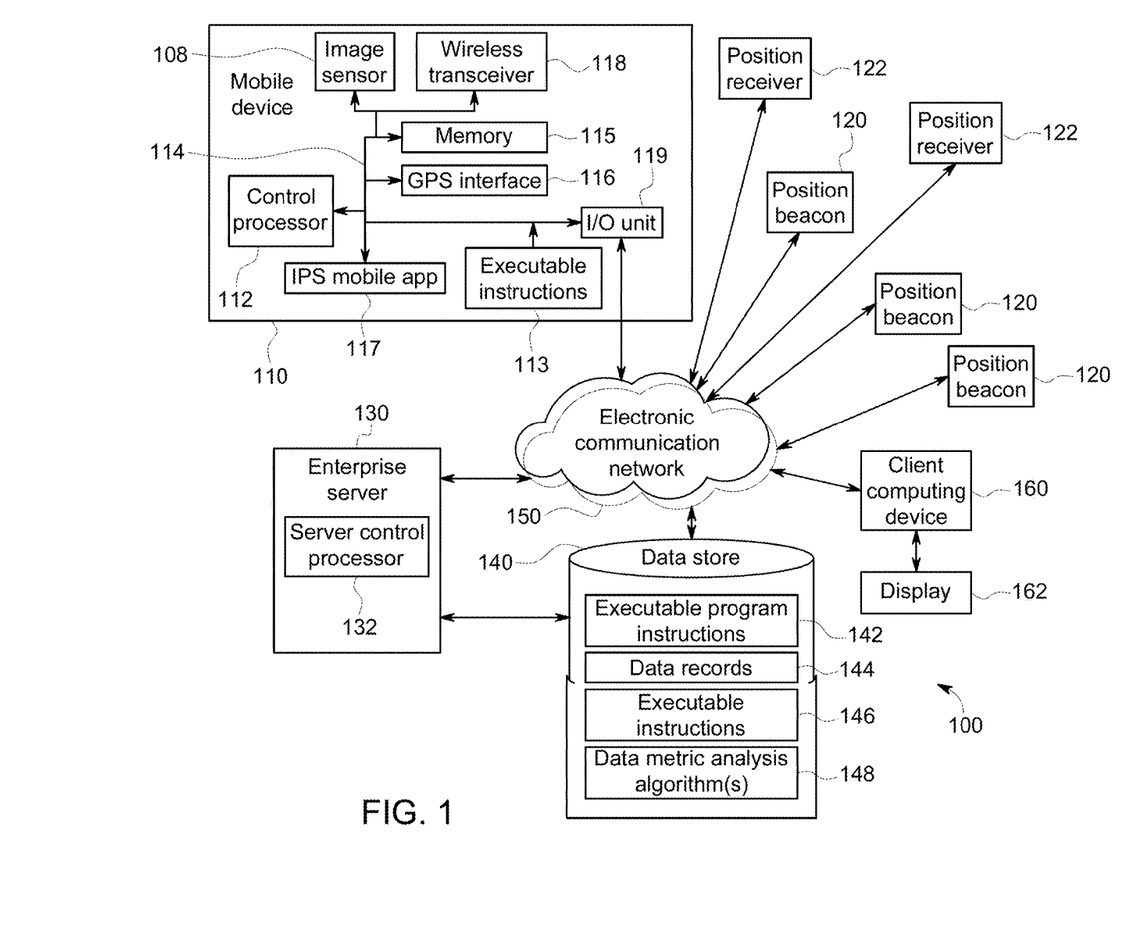
FIG. 1 depicts an IPS system for collection, analytics, and display of indoor positioning data in accordance with an embodiment.

FIG. 1 depicts system 100 for the collection, analysis, and display of IPS data in accordance with embodiments. An embodying mobile device system includes mobile device 110, which can include mobile device control processor 112 that communicates with other components over internal data/control bus 114. Control processor 112 accesses computer executable instructions 113, which can be stored in memory 115 to implement IPS mobile app 117. The mobile device can include input/output (I/O) unit 119 that communicates across electronic communication network 150. Mobile device 110 can include one or more technologies that can receive position beacons broadcast throughout the structure. These technologies can include global positioning system (GPS) interface 116, images sensor 108, and/or wireless transceiver 118.

GPS interface 116 can receive signals and determine the position of the mobile device based on the received signals. In many enclosed structures the required GPS signals could be blocked. In accordance with embodiments, at least one of image sensor 108 and wireless transceiver 118 can be used to locate the wireless device within the structure.

System 100 includes one or more position beacon(s) 120 that broadcast their position. Position beacons can be distributed about a volume of space (e.g., a retail store, office building, sporting arena, etc.), or associated with particular items and/or products to be monitored by the IPS.

The position beacons can communicate (wireless or hardwired) with system 100 across electronic communication network 150. In some implementations, the position beacons can broadcast their position beacon via a short range wireless communication protocol (e.g., Bluetooth, low energy Bluetooth, near field communication, Airplay, etc.) for receipt by mobile device 110. The position beacon(s) can be co-located, incorporated within, or independent of luminaires. In some implementations, these position beacons can be transmitted by lamps throughout the structure as visible light communication (VLC), which is a data communication technology that uses ubiquitous lamps for wireless communication.

Image sensor 108 (e.g., a camera) can include a flash and/or lamp. Image sensor 108 can receive a VLC position beacon to locate itself within the structure. The flash and/or lamp of the image sensor can be used to transmit a VLC message containing the mobile device position to position receiver(s) 122. In other implementations, wireless transceiver 118 can receive position beacons transmitted by wireless short-range communication technologies. The wireless transceiver can transmit the mobile device position location to the position receivers.

The control processor may be a processing unit, a field programmable gate array, discrete analog circuitry, digital circuitry, an application specific integrated circuit, a digital signal processor, a reduced instruction set computer processor, etc.

Electronic communication network 150 can be, can comprise, or can be part of, a private internet protocol (IP) network, the Internet, an integrated services digital network (ISDN), frame relay connections, a modem connected to a phone line, a public switched telephone network (PSTN), a public or private data network, a local area network (LAN), a metropolitan area network (MAN), a wide area network (WAN), a wireline or wireless network, a local, regional, or global communication network, an enterprise intranet, any combination of the preceding, and/or any other suitable communication means. It should be recognized that techniques and systems disclosed herein are not limited by the nature of network 150.

Coupled to electronic communication network 150 is enterprise server 130, which includes server control processor 132. Operation, communication and other functions of the enterprise server can be performed under the control of server control processor 132. Communicatively coupled to the enterprise server 130 is data store 140 where executable program instructions 142 can be stored. Data store 140 can include a repository of data records 144, executable applications 146, data metric analysis algorithm(s) 148, and other items to be accessed by the enterprise server. In some embodiments, data store 140 can be in communication with the electronic communication network.

Client computing device 160 is coupled to communication network 150. The client computing device can be a personal computer, mobile device, tablet, smart terminal, etc. connected to the client computing device is display 162. The client computing device includes video graphic components that are capable of displaying an interactive graphic user interface on the display.

In accordance with embodiments, system 100 can be provided input data from an enterprise and/or organization that is operating the system. For example, a retail enterprise might provide data that can include but is not limited to merchandising information (e.g., shelf allocation, product categories, vendor/brand identification, etc.), store department layout/floorplan, employee assignments, sales/revenue information (gross, net, per square foot, by department, etc.). The input data can be stored in data records 144. This input data can be supplemented from information and data which is collected from IPS mobile app 117, which is used by guests as they move through the space.

In accordance with embodiments, the IPS mobile app itself can track the location and movements of the guest over time. The IPS mobile app can provide to its user certain navigation and other tools for an enhanced shopping experience. For example, the IPS mobile app can request a map of the indoor space from the enterprise server. Based on the map, and the mobile device position, route instructions to a specific location and/or department within the indoor space can be provided to the user at their request. The data from this app can be anonymized and aggregated with location data for use by system 100 in calculating various analytics regarding the guest's interaction with the interior volume being monitored and its features.

Figure 2:
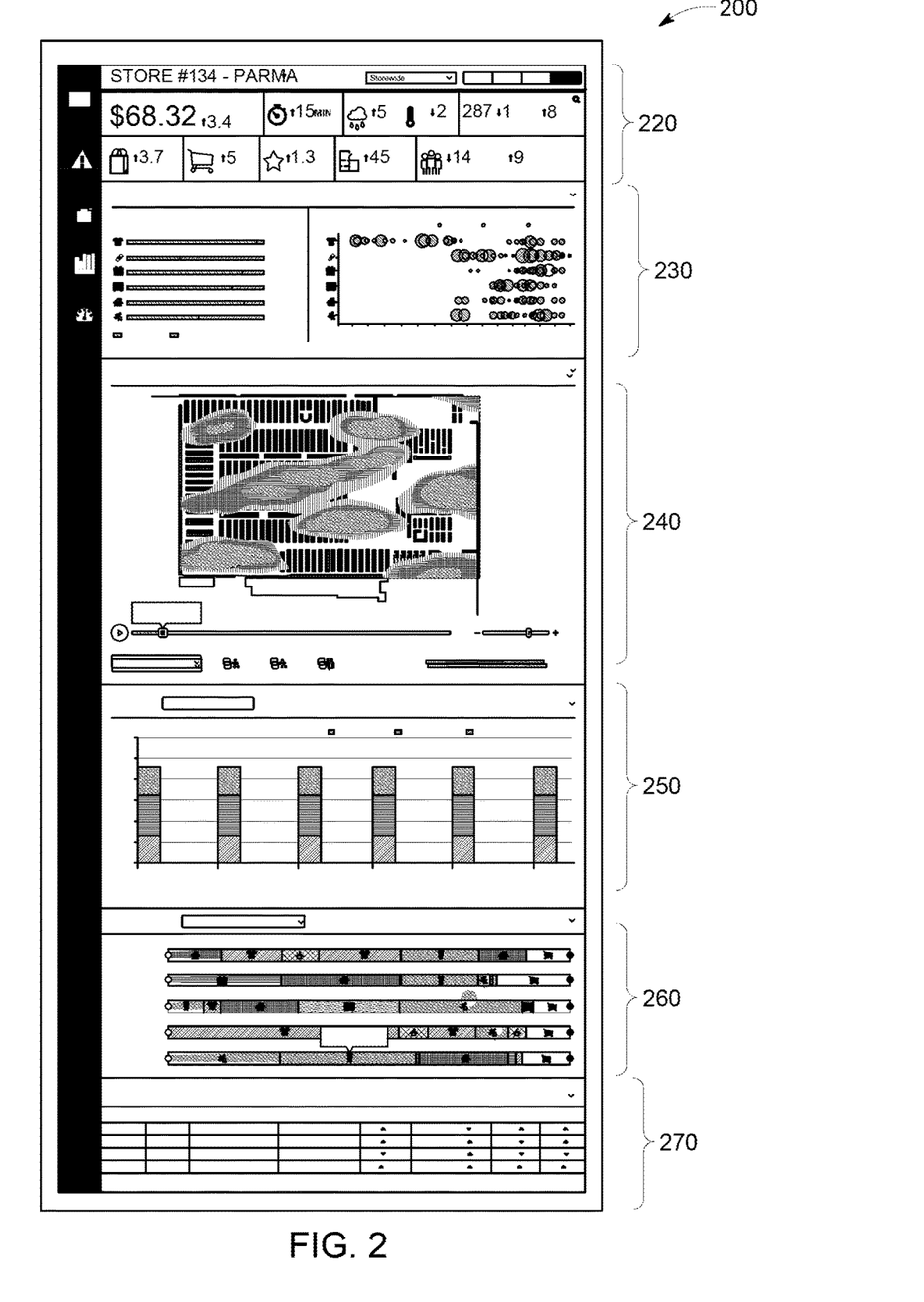
FIG. 2 depicts an IPS dashboard graphical user interface in accordance with an embodiment.

FIG. 2 depicts IPS dashboard 200 graphical user interface in accordance with embodiments. The IPS dashboard presents the user with multiple panes of information. The display panes can include navigation and filtering pane 210 (FIG. 3), key performance indicator pane 220, engagement metric pane 230, map pane 240, analytics pane 250, route tracking pane 260, and marketing campaign pane 270.

These panes provide the user with a single interactive platform that provides information for the monitoring and managing of multiple systems—e.g., lighting, staffing, guest engagements, and/or possibly more. The analytics presented in the display panes can be supported through data collected from the IPS mobile app, which can track guest location and dwell time (time at a location) and also provide navigation and other tools for an enhanced shopping experience.

Figure 3:
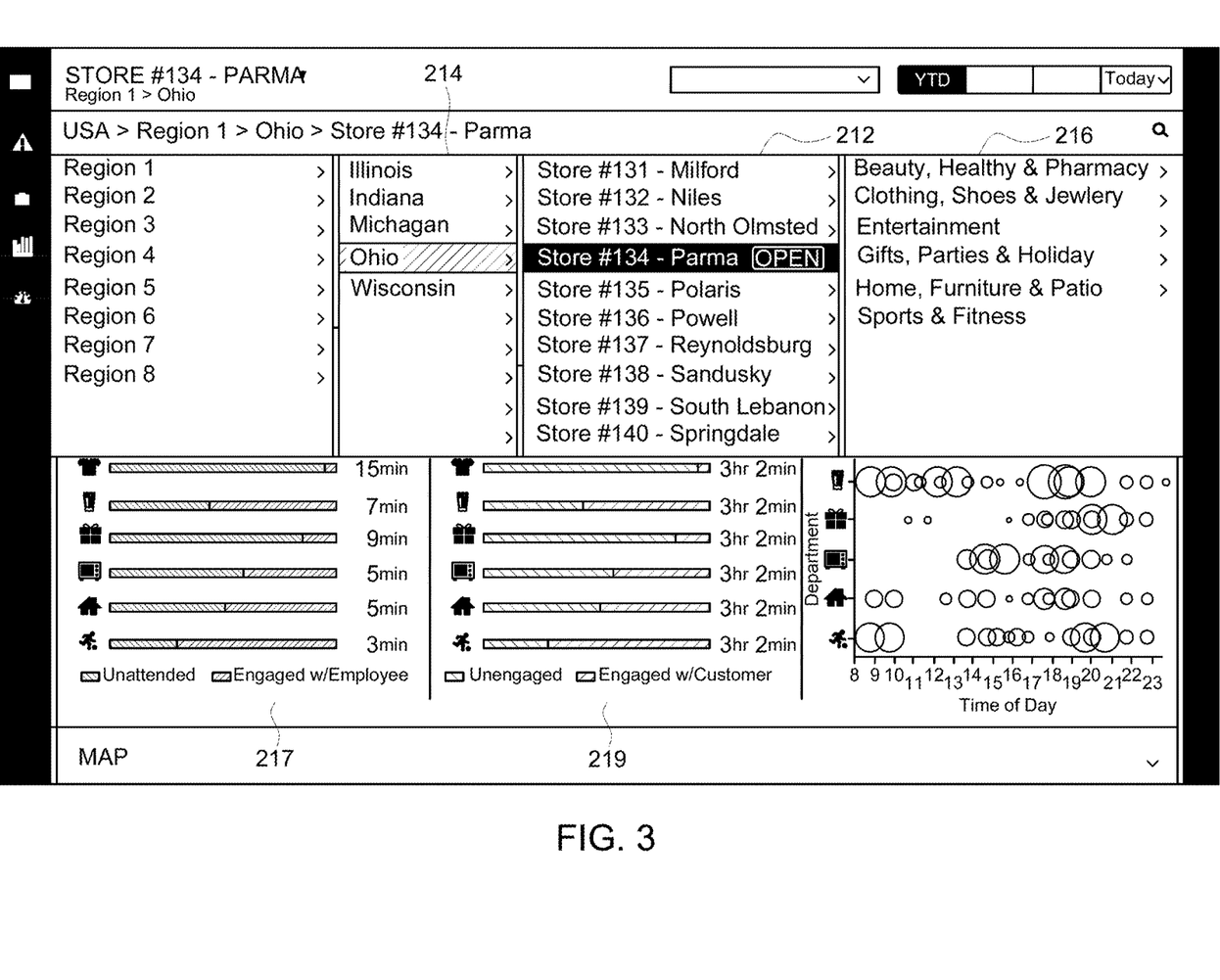
FIG. 3 depicts a navigation and filter display pane of the IPS dashboard of FIG. 2 in accordance with an embodiment.

FIG. 3 depicts navigation/filter display pane 210 in accordance with embodiments. Data is viewable and filterable at various levels of an enterprise's organizational hierarchy (e.g., by store location identifier 212, geographical and/or jurisdictional region 214, category 216, etc.).

The navigation filtering pane can also present information regarding guests' interaction with an employee (item 217) and information regarding an employee's engagement with a guest (item 219). Interaction between a guest and employee can be determined by a proximity threshold between their physical positions as determined by the guest IPS mobile app and an employee's position tracker (mobile device, RFID tag, etc.)

In accordance with embodiments, the IPS dashboard data can be filtered by a combination of filters selectable by the system user to present data at various levels of the organization hierarchy. Historical performance data can be combined with live performance data for a look at year-to-date, month-to-date, week-to-date and day-over-day snapshots. Zones can be set up to analyze the dwell times for entrance, exits, point-of-sale and individual zones (e.g., clothing, grocery, electronics, etc.)

Figure 4:
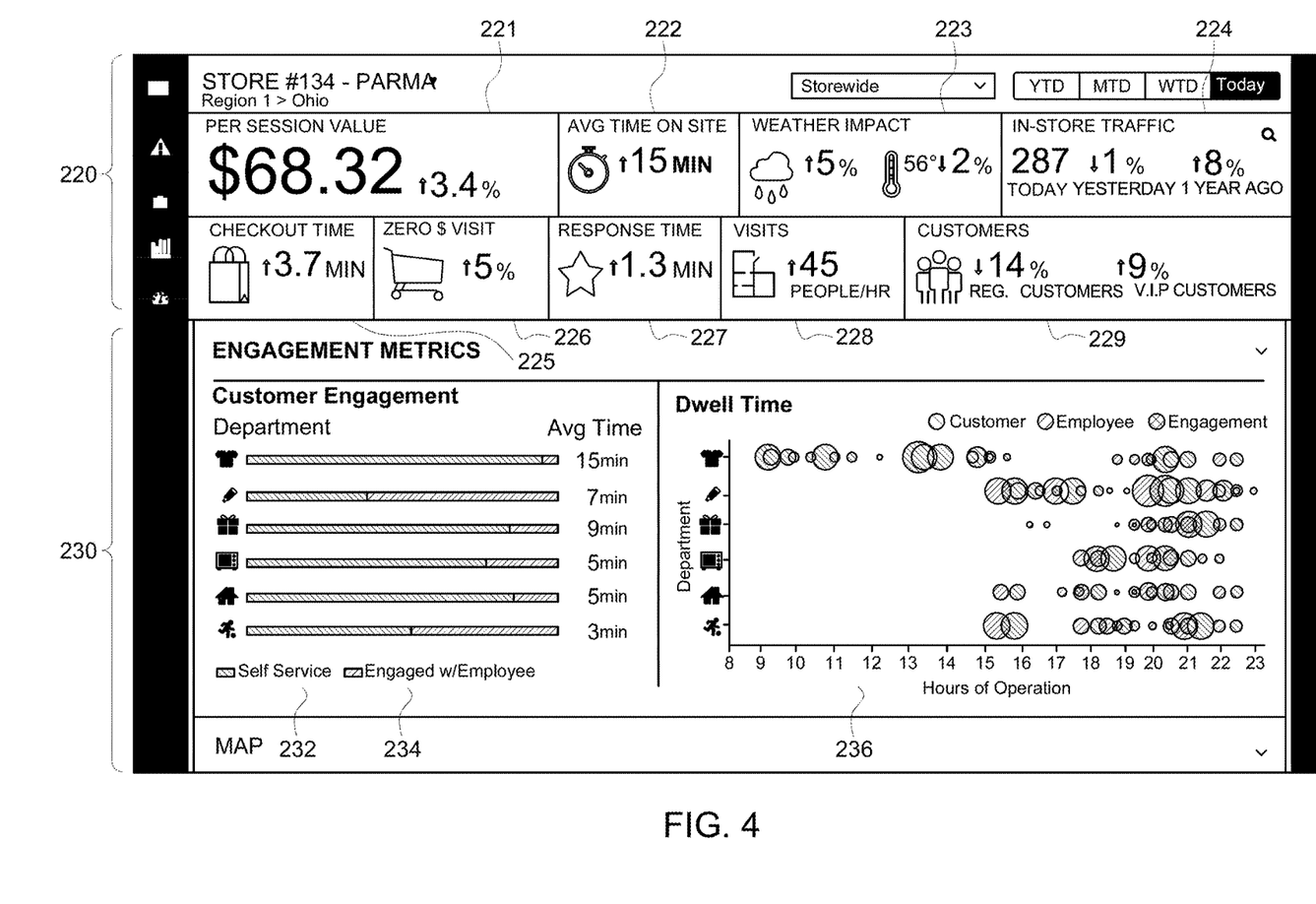
FIG. 4 depicts key performance indicators and engagement metric display panes of the IPS dashboard of FIG. 2 in accordance with an embodiment.

FIG. 4 depicts key performance indicators (KPI) display pane 220 and engagement metric display pane 230 in accordance with an embodiment. The KPI can include a guest's visit per session value and the average value amount change per visit 221; the average time on site 222; weather impact on sales 223 (e.g., today's weather compared to a prior day with similar weather (i.e., a cloudy day tracked against other cloudy days; or temperature); in-store traffic 224 (total count for a given day) can be a live number that shows whether a device using the app entered a given store today, along with historical data comparing to prior data; check-out time 225; zero dollar visit 226 (based on customer(s) that did not go to a cash register and check out); response time 227; visitor flow 228; customer status 229 (unknown, return, frequent purchase club member, etc.).

In accordance with embodiments, the interior volume of a structure (e.g., store) can be partitioned into zones. From these zones, in combination with data provided by the IPS mobile app, system 100 can determine time spent in a particular zone (department, check-out, customer service desk, dressing rooms, etc.). The time spent in each zone can be individually tracked. For example, the time spent within a check-out zone can be computed. The average checkout time per customer can be computed. This average can be compared to individual experience to determine their dwell time compared to the average.

Response time can be determined by the amount of time it takes for an employee to provide assistance to a guest once the guest signals a need for help. The representative can be in possession with a tracking device which broadcast's the representative's position to the IPS. Based on customer status 229, the entrance of a customer worthy of special treatment can be alerted to the employees.

Customer engagement pane 230 can display metrics specific to customer experience by department (signified by graphical icons or other descriptors). The metrics can include the amount of time a customer spends in a self-serve mode 232 (shopping without the aid of an employee) versus engaged with an employee 234. Dwell time 236 graphically presents a view of the time and density of guests and employees in the predefined zones. Using these metrics can provide information to store management for tracking and evaluating how efficient and/or successful the staff is at addressing potential customer needs through employee availability within the zone. In some implementations, the overlapping bubbles of dwell time graphic 236 indicates the close proximity of a guest and an employee.

Figure 5:
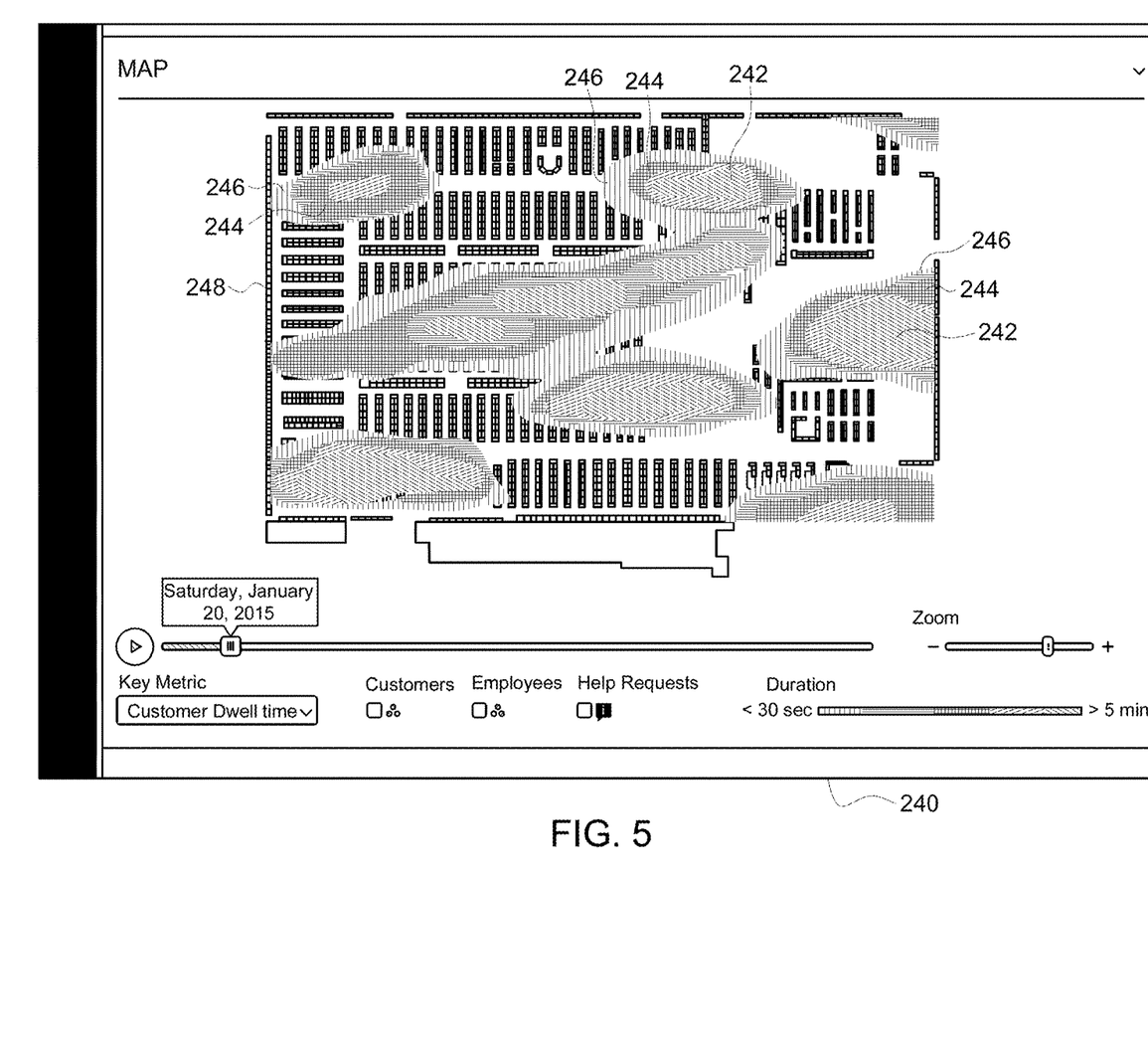
FIG. 5 depicts a map display pane of the IPS dashboard of FIG. 2 in accordance with an embodiment.

FIG. 5 depicts map display pane 240 in accordance with embodiments. The map display pane can present a visual representation of guest movement through the structure over time. The visual representation can be static, or a dynamic (multiple page, or video) time elapsed display.

Map 248 can represent a layout of a floorplan for the structure. For example, map 248 illustrates store shelving units, aisles, counters, open space, etc. A map can be provided for each floor of a multi-floor structure. The darker concentrations 246 can represent a longer dwell time, a lighter concentration 244 can represent smaller dwell time, and the lightest concentration 244 can represent the least dwell time elapsed at a particular location. This information can provide a visualization of insight into where help requests were made, employee and customer density, and/or zooming capabilities for pin-point accuracy.

Figure 6:
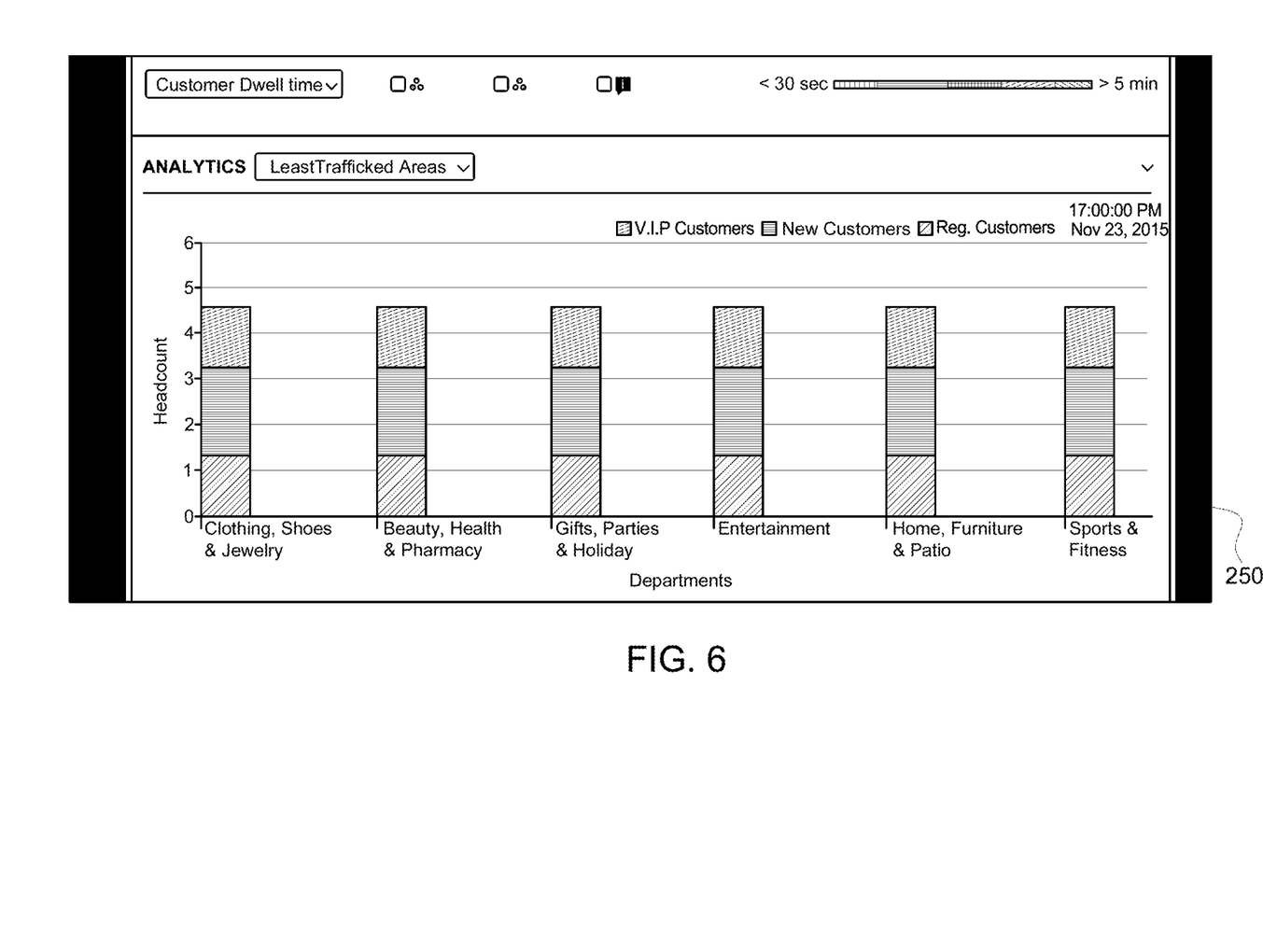
FIG. 6 depicts an analytics display pane of the IPS dashboard of FIG. 2 in accordance with an embodiment.

FIG. 6 depicts analytics display pane 250 in accordance with embodiments. The analytics display pane can present a breakdown of locations where predefined customer segments dwell longest in the store (e.g., new customer trending analysis). These analytics is facilitated by data sharing within the system that uses predefined flags to indicate guest categories/demographics (e.g. new guest, return guest, important guests, gender, etc.). A breakdown of where predefined customer segments dwell longest in the store (e.g. New customer trending analysis).

Figure 7:
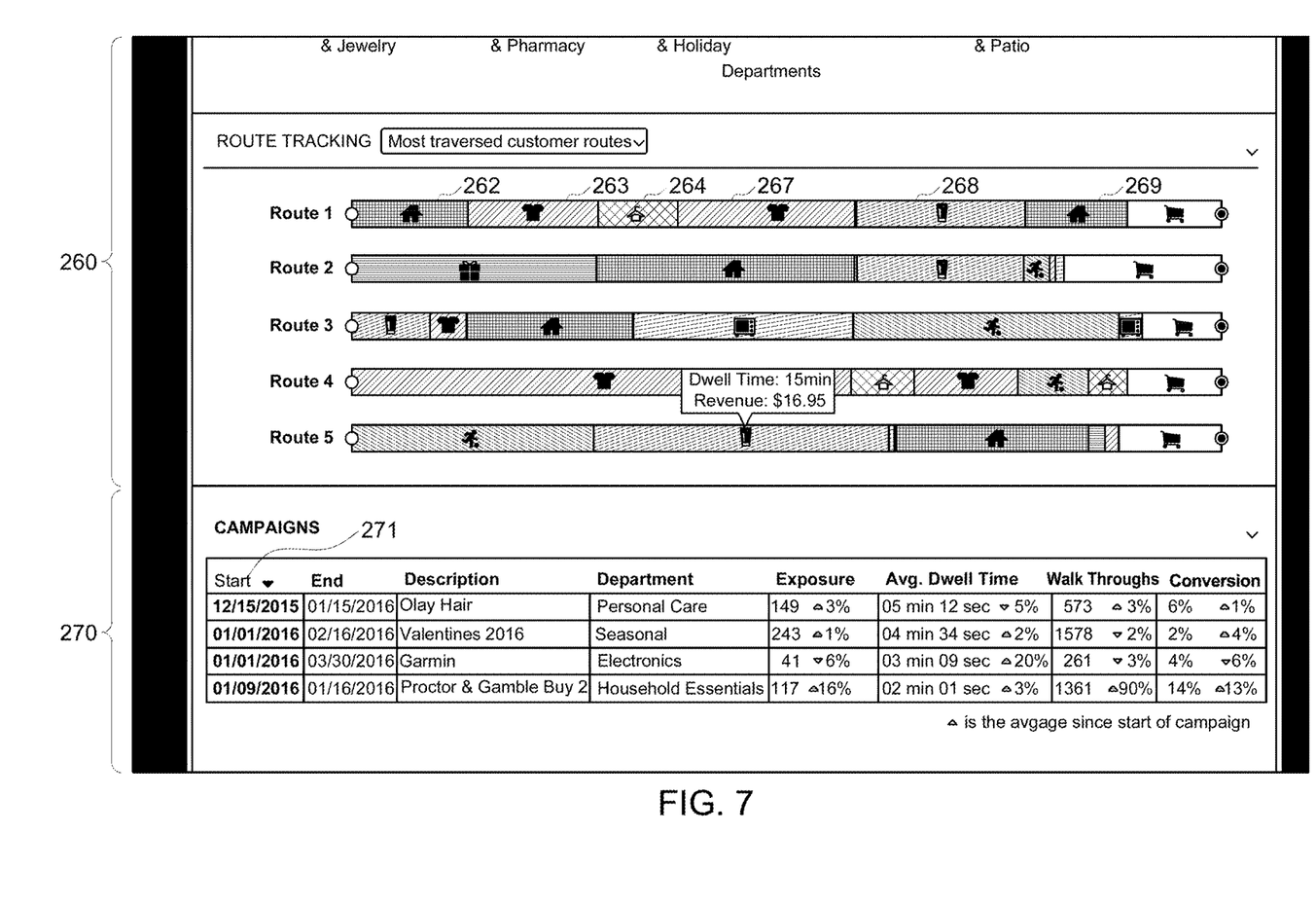
FIG. 7 depicts route tracking and marketing campaign display panes of the IPS dashboard of FIG. 2 in accordance with an embodiment.

FIG. 7 depicts route tracking display pane 260 and marketing campaign display pane 270 in accordance with embodiments. The route tracking display pane can visualize routes traversed through the monitored space. These routes can be prioritized based on the traffic (popularity) of the route—for example, route 1 can be the most traversed. The length of the segments 262, 263, 267, 268, 269 can represent the portion of time spent on average in each zone. The ordering of the segments can represent the path of the route through the depicted zones. Data can represent a record of not just which zones guests dwelled in, but also which zones guests walked through to get to the desired zone. Knowing the route taken by guests, and their associated demographics, can be useful in designing the store display of merchandise.

Marketing campaign display pane 270 provides information regarding metrics related to store campaigns on a daily, weekly, monthly, and/or yearly basis. More detailed information can be provided by activating a link on the graphical interface.

The list can be sorted by each of the headers 271 (start, end date, description, department, etc.). In accordance with embodiments, position information from the IPS mobile app can provide details on a guest's dwell time. The position information can be analyzed with regard to predetermined thresholds. For example, in one implementation a standing still dwell time can be labeled based on a guest remaining stationary for about 3 seconds or longer. In accordance with implementations, a guest dwell time can be captured as guests enter specified campaign zones and ends as they exit. A sale conversion can be counted if back end data can be provided for flagging a purchase of the campaign item(s). Bounce rate/walk through can be counted as guests stroll through a zone without engaging campaign zones or materials.

Figure 8:
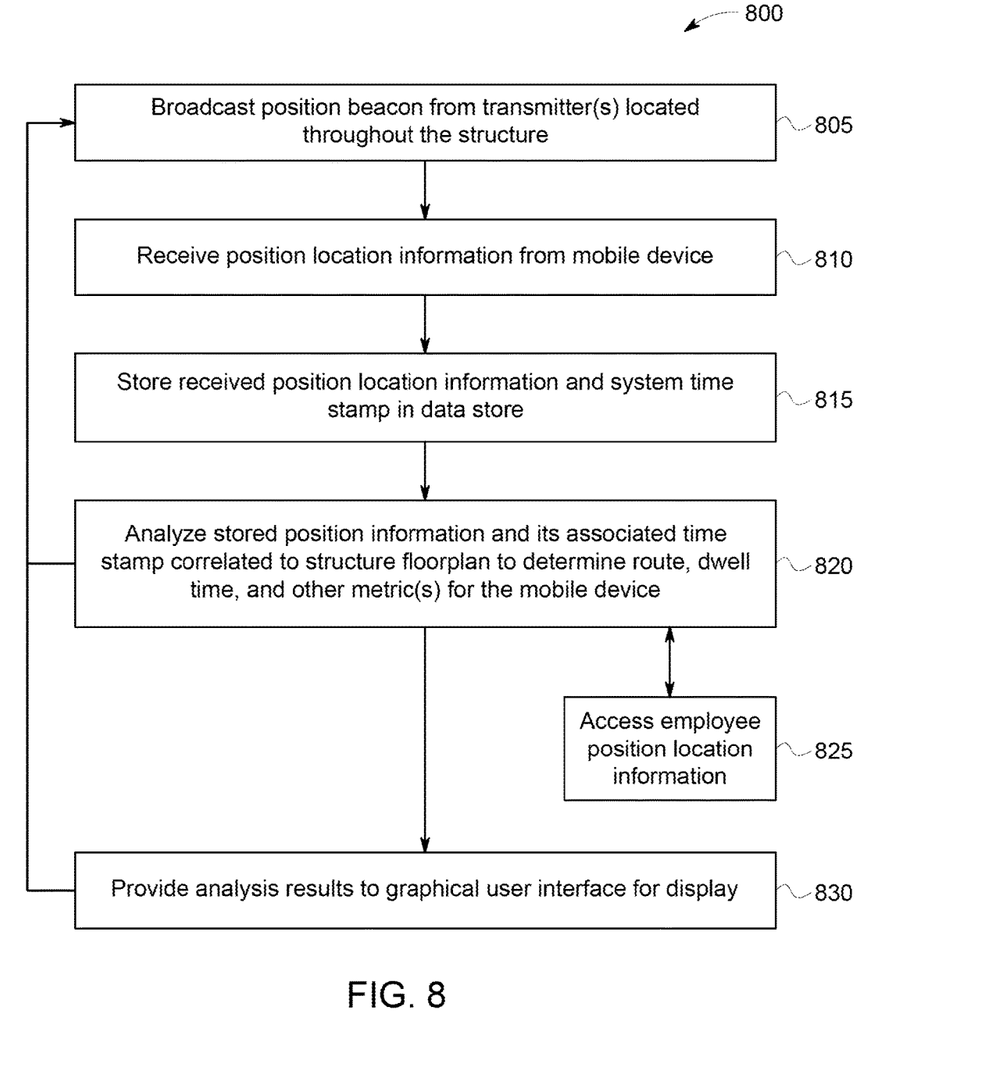
FIG. 8 depicts a flowchart for a process to track the indoor position information in accordance with an embodiment.

FIG. 8 depicts process 800 for tracking indoor position information in accordance with an embodiment. One or more transmitters can broadcast position beacons, step 805, indicating their location using a short range wireless communication protocol. The position beacon(s) can be transmitted continuously, or at predetermined intervals. The location of the position beacon transmitters within the structure are known to system 100. In some implementations, the transmitter locations can be depicted on map 248.

An application on a mobile device can receive the position beacon. The application can discriminate its location and transmit the mobile device position information, step 810. The mobile device can transmit its position either continuously or at predetermined intervals (which may or may not equal the beacon interval).

The mobile device position information can be received by position receivers. The received mobile device position information can be stored, step 815, in records within a data store. A timestamp and a unique mobile device identifier can also be stored in records associated with the mobile device position information. The sampling, timestamp, and storage of the mobile device position information can be conducted at predetermined intervals.

Data record analysis algorithm 148 can access the records of mobile device position information, the correlated timestamp, and the unique mobile device identifier to perform analysis, step 820, of this data. The algorithm can determine the route through the structure taken by the mobile device (e.g., the guest) by tracking the stored data in time order.

In accordance with implementations, the interior of the structure can be partitioned into zones with lines of demarcation between the different zones (e.g., sections, areas, departments, etc.) of the structure. The data record analysis algorithm can identify when the mobile device crossed these lines of demarcation. From this, dwell time data for a specific area (e.g., women's shoes, men's clothes, etc.) can be calculated.

In some implementations, employee position information (e.g., location, identifier, and timestamp) can be accessed, step 825. This information can be used by the data record analysis algorithm to determine metrics regarding interaction between guests and employees. For instance, does the route of the guest indicate they sought out an employee, or did the employee approach the guest; what was the duration of the interaction between the employee and guest. In some implementations, the data analysis algorithm can use a selectable proximity range between the guest and employee when determining the length of interaction.

Metrics determined by data record analysis algorithm 148 can be displayed in IPS dashboard 200 graphical user interface, step 830. Metrics can include the amount of time a customer spends in a self-serve mode 232 versus engaged with an employee 234; dwell time 236 indicating time and density of guests and employees in the predefined zones.

In accordance with some embodiments, a computer program application stored in non-volatile memory or computer-readable medium (e.g., register memory, processor cache, RAM, ROM, hard drive, flash memory, CD ROM, magnetic media, etc.) may include code or executable instructions that when executed may instruct and/or cause a controller or processor to perform methods discussed herein such as a method for the collection, analysis, and display of indoor positioning data and metrics pertaining to the location of persons, as described above.

The computer-readable medium may be a non-transitory computer-readable media including all forms and types of memory and all computer-readable media except for a transitory, propagating signal. In one implementation, the non-volatile memory or computer-readable medium may be external memory.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

What we claim is:

1. An indoor positioning data system comprising:
a mobile device (110) including an indoor positioning system application (117), the mobile device in communication with an enterprise server (130) across an electronic communication network (150);
the enterprise server including a control processor (132);
a datastore (140) in communication with the enterprise server, the datastore including one or more data records (144), a data metric analytic algorithm (148), an executable application (146), and executable program instructions (142);
one or more position beacons (120) distributed throughout a volume of an indoor space to be monitored;
the position beacons configured to broadcast their respective positions within the indoor space;
the control processor configured to execute the executable instructions to cause the processor to:
perform the data metric analytic algorithm;
display results of the data metric algorithm on a display (162) of a client computing device (160);
collect position information from the mobile device and position information from the position beacons;
compare the collected position information to a predetermined distance threshold;
if the collected position information is within the predetermined distance threshold, record the position of the mobile device in the data records;
correlate the recorded position with predefined zones representing areas within the indoor space; and
determine from the recorded position a dwell time in excess of a predetermined time at one or more of predefined zones.

2. The indoor positioning data system of claim 1, including the executable instructions causing the control processor to access enterprise or organizational data from the datastore, the enterprise or organizational data being correlated by the control processor to a position of the mobile device within the indoor space.

3. The indoor positioning data system of claim 1, including the indoor positioning system mobile application including mobile device executable instructions (113) that cause a mobile device control processor (112) to track a location and one or more movements of the mobile device within the indoor space based using global positioning system data received from a global positioning system interface (116) in the mobile device.

4. The indoor positioning data system of claim 3, including the mobile device executable instructions causing the mobile device control processor to access a map of the indoor space from the enterprise server, the map indicating one or more zones within the indoor space.

5. The indoor positioning data system of claim 4, including the executable instructions causing the control processor to determine route navigation instructions to a guest based on a guest request to proceed to a guest specified zone in the indoor space.

6. An indoor positioning data system comprising:
a mobile device (110) including an indoor positioning system application (117), the mobile device in communication with an enterprise server (130) across an electronic communication network (150);
the enterprise server including a control processor (132);
a datastore (140) in communication with the enterprise server, the datastore including one or more data records (144), a data metric analytic algorithm (148), an executable application (146), and executable program instructions (142);
one or more position beacons (120) distributed throughout a volume of an indoor space to be monitored;
the position beacons configured to broadcast their respective positions within the indoor space;
the control processor configured to execute the executable instructions to cause the processor to:
perform the data metric analytic algorithm;
display results of the data metric algorithm on a display (162) of a client computing device (160); and
a graphical user interface that presents an indoor positioning dashboard (200) having multiple display panes, the multiple display panes including:
a navigation pane configured to present information regarding an interaction between a guest and an enterprise employee, the information including a dwell time of the guest and enterprise employee in close proximity;
a filtering pane configured to present data associated with a guest visit to the indoor space, the data correlated to an organizational hierarchy of the enterprise within the indoor space;
a key performance indicator pane configured to present data representing financial quantification factors over time;
a map pane configured to present a visual representation of the concentration of multiple guest movements over time within the indoor space;
an analytic pane configured to present a visual representation of guest dwell time correlated to locations within the indoor space;
a route tracking pane configured to present a visual representation of one or more routes followed by guests within the indoor space correlated to specific locations or areas of the indoor space; and
a marketing campaign pane configured to present metrics related to store campaign performance over selectable periods of time.

7. A non-transitory computer readable medium containing computer-readable instructions stored therein for causing a control processor to perform operations of an indoor positioning system, the operations comprising:
collect position information from a mobile device within an indoor space and position information from one or more position beacons distributed at fixed locations within the indoor space;
compare the collected position information to a predetermined distance threshold;
if the collected position information is within the predetermined distance threshold, record the position of the mobile device in data records;
perform a data metric analytic algorithm configured to correlate the mobile device position information with data provided from an enterprise server;
display results of the data metric analytic algorithm on a display (162) of a client computing device (160).

8. The non-transitory computer readable medium of claim 7, including executable instructions that cause the control processor to correlate the recorded position with predefined zones representing areas within the indoor space.

9. The non-transitory computer readable medium of claim 7, including executable instructions that cause the control processor to determine from the recorded position a dwell time in excess of a predetermined time at one or more of predefined zones.

10. The non-transitory computer readable medium of claim 7, including executable instructions that cause the control processor to access enterprise or organizational data from the datastore, the enterprise or organizational data being correlated by the control processor to a position of the mobile device within the indoor space.

11. The non-transitory computer readable medium of claim 7, including mobile device executable instructions in the mobile device that cause a mobile device control processor to track a location and one or more movements of the mobile device within the indoor space based using global positioning system data received from a global positioning system interface (116) in the mobile device.

12. The non-transitory computer readable medium of claim 11, including mobile device executable instructions that cause the mobile device control processor to access a map of the indoor space from the enterprise server, the map indicating one or more zones within the indoor space.

13. The non-transitory computer readable medium of claim 12, including mobile device executable instructions that cause the mobile device control processor to determine route navigation instructions to a guest based on a guest request to proceed to a guest specified zone in the indoor space.

14. The non-transitory computer readable medium of claim 7, including executable instructions that cause the control processor to present a graphical user interface indoor positioning dashboard (200) having multiple display panes.

15. The non-transitory computer readable medium of claim 14, including executable instructions that cause the control processor to:

present in the interface indoor positioning dashboard a navigation pane configured to present information regarding an interaction between a guest and an enterprise employee, the information including a dwell time of the guest and enterprise employee in close proximity;

present in the interface indoor positioning dashboard a filtering pane configured to present data associated with a guest visit to the indoor space, the data correlated to an organizational hierarchy of the enterprise within the indoor space;

present in the interface indoor positioning dashboard a key performance indicator pane configured to present data representing financial quantification factors over time;

present in the interface indoor positioning dashboard a map pane configured to present a visual representation of the concentration of multiple guest movements over time within the indoor space;

present in the interface indoor positioning dashboard an analytic pane configured to present a visual representation of guest dwell time correlated to locations within the indoor space;

present in the interface indoor positioning dashboard a route tracking pane configured to present a visual representation of one or more routes followed by guests within the indoor space correlated to specific locations or areas of the indoor space; and present in the interface indoor positioning dashboard a marketing campaign pane configured to present metrics related to store campaign performance over selectable periods of time.

16. The non-transitory computer readable medium of claim 7, including executable instructions that cause the control processor to implement the data metric analytic algorithm using position information in conjunction with predetermined thresholds.

* * * * *